Aug. 16, 1927.
R. E. HANSON
FLOW INDICATOR
Filed Nov. 10, 1925
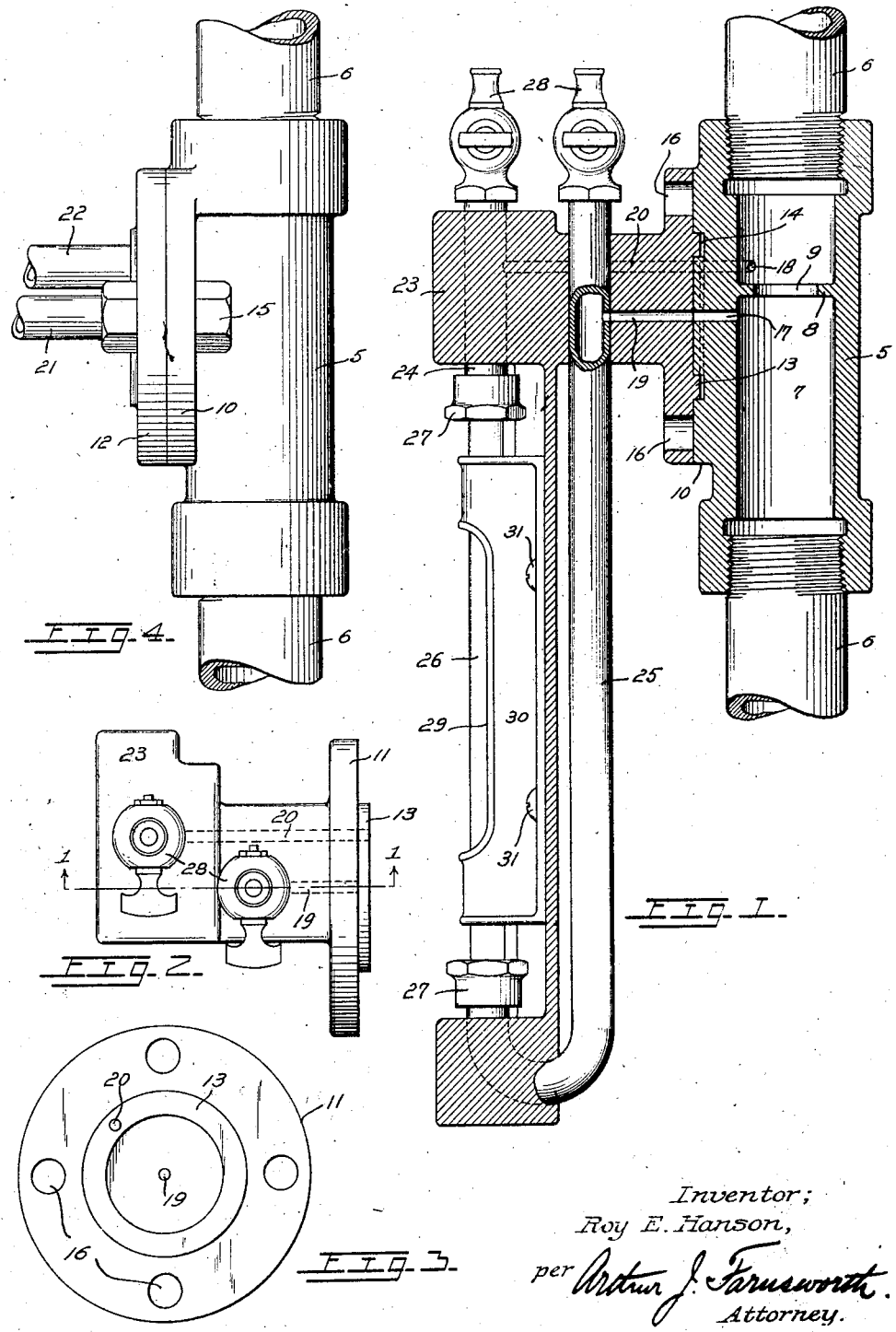
Inventor:
Roy E. Hanson,
per Arthur J. Farnsworth
Attorney.

Patented Aug. 16, 1927.

1,639,342

UNITED STATES PATENT OFFICE.

ROY E. HANSON, OF LOS ANGELES, CALIFORNIA, ASSIGNOR OF ONE-HALF TO BARTON JONES, OF LOS ANGELES, CALIFORNIA, AND ONE-HALF TO JAMES B. MOREY, OF CULVER CITY, CALIFORNIA.

FLOW INDICATOR.

Application filed November 10, 1925. Serial No. 68,143.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means for measuring the flow of fluids, and among its more important objects are; first, to provide a simple and compact instrument adapted for accurate flow measurements without the use of any moving parts; second, to supply a device of this nature that can be installed anywhere in a vertical, horizontal or angularly positioned flow line; third, to furnish a practical way for measuring flows at a remote point; and fourth, to accomplish the above by means of a very simple and relatively inexpensive construction.

My objects are attained in the manner illustrated in the accompanying drawing, in which—

Figure 1 is a vertical section of my complete invention in side elevation the section being taken on the line 1—1 of Fig. 2;

Figure 2 is a plan view of a portion of the apparatus shown in Fig. 1;

Figure 3 is a face view of the connecting flange of the indicating portion of the device, that is, a face view of the flange shown on the right hand side of Fig 2; and Figure 4 is a side elevation of the flow line fitting used as a part of my invention, arranged for installing the indicator at a remote point.

Similar reference numerals refer to similar parts throughout the several views.

My invention makes use of the orifice principle for determining the flow of fluids. In this system of measurement the flow is made to pass through an orifice of known characteristics, and the pressure gradient causing the flow through the orifice is determined. The flow is then calculated from this data in well known ways; or the flow is empirically determined with relation to the pressure gradient, and an empirical scale is provided for indicating the gradient in terms of flow.

In utilizing the above principles I employ a flow fitting 5, adapted for permanent insertion in a pipe line 6 containing the fluid whose flow is to be measured. This fitting has a straight smooth flow passage 7 therethrough with an intermediate diaphragm 8 therein, and an orifice 9 of known characteristics through the diaphragm. Flow fitting 5 has a faced flange 10 for making a flange connection to a similar flange 11 on the indicator; or for cooperating with an independent flange 12, adapted for connecting the indicator at a remote point, as shown in Fig. 4. These flange connections are made as male and female; the flange face on the flow fitting being provided with a concentric circular groove, and the cooperating flanges being provided with concentric circular ridges 13 adapted to fit closely within the groove. The height of the ridges is such that when the flange joint is completed there will be a circular passage 14 between the face of the ridge and bottom of the groove as shown in Fig. 1.

As indicated above the flange face of the flow fitting is similar in appearance to the faces of the cooperating flanges illustrated in Fig. 3, except that a circular groove takes the place of the circular ridge 13. There is a further difference in that the flange of the flow fitting is provided with only two diametrically opposite bolt holes for the connecting bolts 15. The cooperating male flanges are provided with four or more bolt holes 16 in order that the connection may be made in several angular relations. My indicator is preferably installed in a vertical or nearly vertical position, and these extra bolt holes in its flange, when they are properly positioned, enable this to be done whether the flow fitting 5 is vertical, horizontal or inclined.

A small concentric hole 17 is drilled from the face of flange 10 into flow passage 7 on one side of orifice 9; and a similar hole 18 is drilled from the bottom of the groove of flange 10 into the flow passage on the other side of the orifice. By means of these holes the static pressures on the two sides of the orifice may be transmitted to the manometric tubes of the indicator through corresponding holes 19 and 20 therein, or through connecting pipes 21 and 22 when the indicator is at a remote point. The circular passage 14 permits of transmitting the pressure irrespective of the angular relation of the two parts of the bolted flange connections.

The indicating portion of my invention comprises a body part 23 on which the previously described flange 11 is formed, and into which the manometric tube parts 24 and 25 are cast or otherwise suitably attached. Holes 19 and 20 are drilled through the body into the respective bores of tubes 25 and 24 so that pressures from the flow passage of the flow fitting may be transmitted to these tubes. When the indicator is to be installed at a remote point, a female flange that otherwise is similar to flange 12 is bolted to the indicator, and the flow pressures are transmitted through pipes 21 and 22.

Manometric tube 25 is U-shaped and it is mounted in body 23 in such a way that its short end is opposed to the lower end of tube 24. Between these two tube ends an indicating glass tube 26 is then mounted by means of the stuffing boxes 27. After installation of the indicator a suitable quantity of mercury is poured into the manometric tubes through one of the pet cocks 28. The latter also serve for discharging any air that may be trapped in the indicator during installation.

A scale by which changes in the height of the mercury column in glass 26 may be measured is provided adjacent the glass. This scale may be etched upon the face of a flange 29 of a glass protector 30, and the latter may be attached to the body by means the screws 31. The scale may be graduated to gallons per minute or other suitable flow units, and should be adjustable vertically as as by having the attaching screws 31 pass through vertical slots in protector 30. In this way the zero of the scale may be set to coincide with the level of the mercury column when there is no flow in fitting 5.

The construction and operation of my device will be apparent from the foregoing description, since it will be seen that variations of the flow in fitting 5 will cause corresponding changes in the level of the mercury column in glass tube 26. In addition it only seems necessary to say that the indicator must be installed in the position for which its scale is calibrated. Thus the indicator may be used in an inclined position if its indicating scale is correspondingly proportioned, but ordinarily it is preferable to install the indicator in a vertical position and make use of a scale adapted for this.

Having thus fully described my invention, I claim:—

1. A device of the character described comprising; a flow fitting provided with a faced exterior surface, with a bore therethrough, with a diaphragm having a flow-measuring orifice therethrough intermediately intercepting said bore, and with separate passages leading from said surface to the bore on opposite sides of the diaphragm; and a differential pressure indicator having a correspondingly faced exterior surface and separate passages leading therefrom; said fitting and indicator being detachably connected with said exterior surfaces engaging and said respective pairs of passages in communication; and one of said surfaces having a groove therein communicating with one of said passages and positioned in such a manner that said connection may be effected in selective angular relations of the surfaces.

2. A device of the character described comprising; a flow fitting provided with a faced exterior surface, with a bore therethrough, with a diaphragm having a flow-measuring orifice therethrough intermediately intercepting said bore, and with separate passages leading from said surface to the bore on opposite sides of the diaphragm; and a differential pressure indicator having a correspondingly faced exterior surface and separate passages leading therefrom; said fitting and indicator being detachably connected with said exterior surfaces engaging and said respective pairs of passages in communication; and one of said surfaces having a circular groove therein communicating with one of said passages and concentric with the outlet of its other passage, whereby said connection may be effected in selective angular relations of the surfaces.

3. A device of the character described comprising; a flow fitting provided with a faced exterior surface, with a bore therethrough, with a diaphragm having a flow-measuring orifice therethrough intermediately intercepting said bore, and with separate passages leading from said surface to the bore on opposite sides of the diaphragm; and a differential pressure indicator provided with a manometric U-tube, and with a correspondingly faced exterior surface and separate passages leading therefrom to the respective branches of the U-tube; said fitting and indicator being detachably connected with said exterior surfaces engaging and said respective pairs of passages in communication; and one of said surfaces having a circular groove therein communicating with one of said passages and concentric with the outlet of its other passage, whereby said connection may be effected in selective angular relations of the surfaces.

ROY E. HANSON.